Dec. 1, 1953     W. A. MAXWELL     2,660,816
COMBINATION BULLDOZER AND SHOVEL ARRANGEMENT
Filed Feb. 17, 1949     2 Sheets-Sheet 1
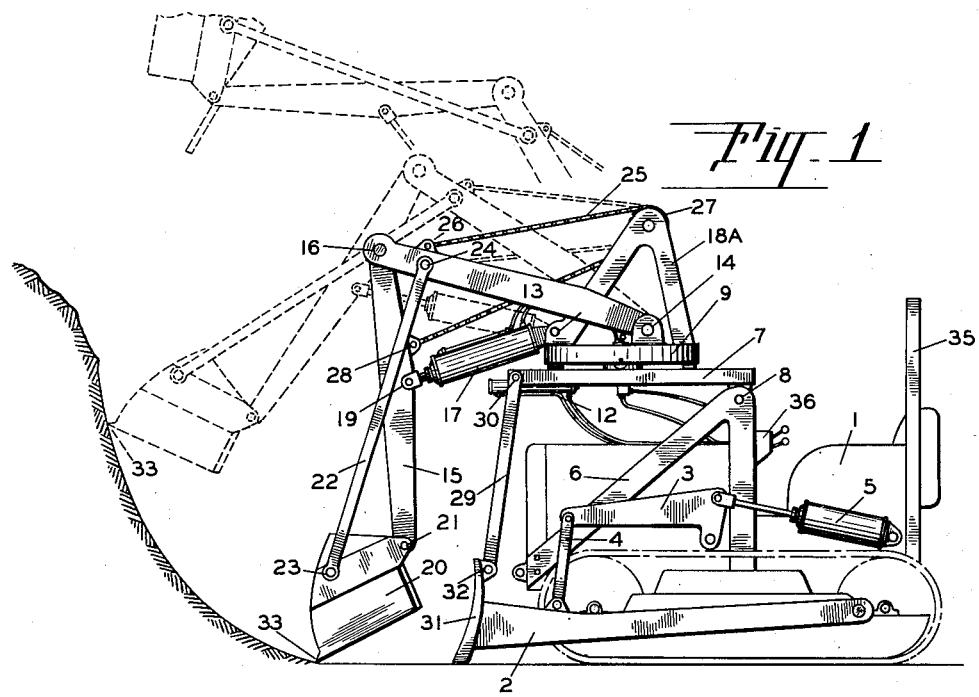
INVENTOR.
WILLARD A. MAXWELL
BY
ATTORNEY Dec. 1, 1953 W. A. MAXWELL 2,660,816
COMBINATION BULLDOZER AND SHOVEL ARRANGEMENT
Filed Feb. 17, 1949 2 Sheets-Sheet 2
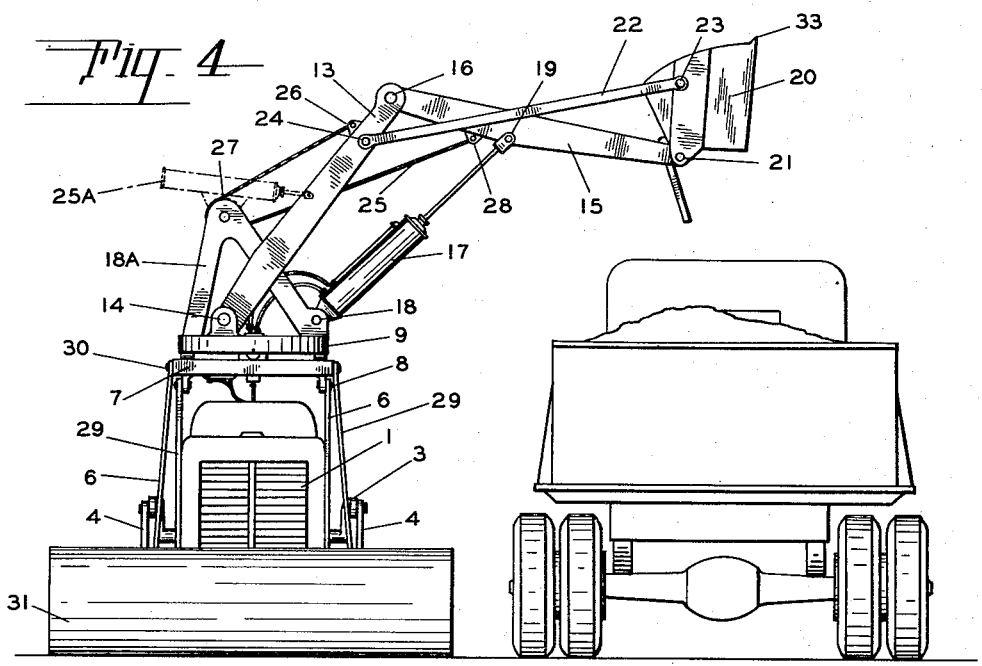
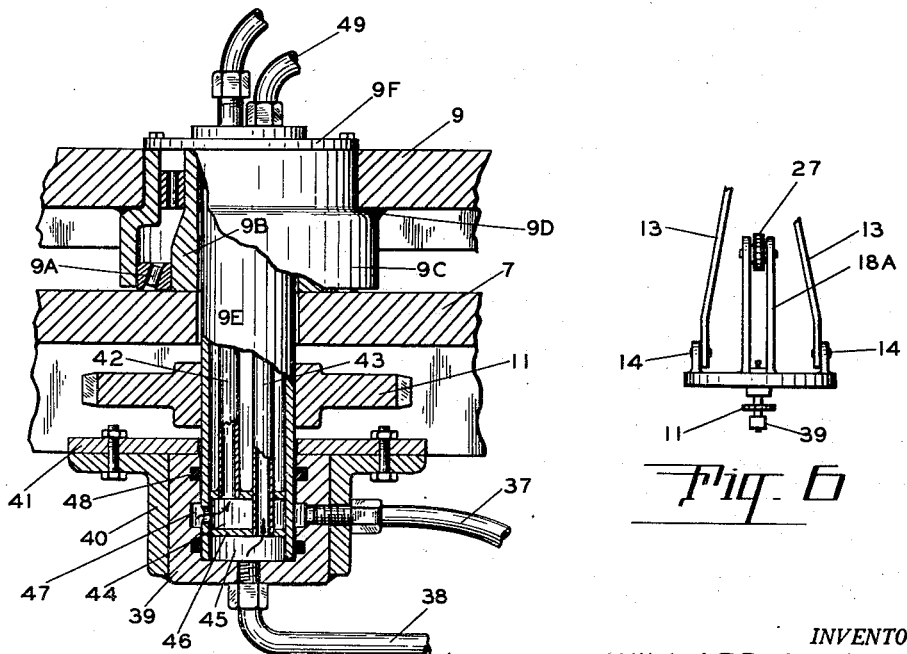
INVENTOR.
WILLARD A. MAXWELL
BY
ATTORNEY Patented Dec. 1, 1953

2,660,816

UNITED STATES PATENT OFFICE 2,660,816

COMBINATION BULLDOZER AND SHOVEL ARRANGEMENT

Willard A. Maxwell, Portland, Oreg.

Application February 17, 1949, Serial No. 76,929

5 Claims. (Cl. 37—117.5)

This invention relates to a combination bulldozer and shovel and is particularly adapted to be mounted upon crawler type tractors.

The primary object of the invention is to mount a shovel upon a special supporting frame upon the tractor and adapted to work in combination with the bulldozer.

A further object of the invention is to mount the shovel to the tractor in such a manner that the shovel can be operated independently of the bulldozing operations.

Another object of the invention is to be able to take the shovel out of operation without disconnecting the same from the tractor and bring the bulldozer into full operation.

A still further object of the invention is to support the weight of the shovel upon the bulldozer while the shovel is in operation, providing a solid foundation for the shovel.

Another object of the invention is to be able to operate the bulldozer without taking the shovel out of working position.

And still a further object of the combination of the shovel and bulldozer is to be able to transport the equipment from one place to another without dismounting either the shovel or the bulldozer from the tractor.

A further object is to so mount the shovel on and over the tractor frame and at the front over the engine hood to swing up and down with or independently of a bulldozer or swivel by turning to either side for dumping its load or at the rear when not in use or being transported from place to place, but to extend over the bulldozer for operation in front of the blade thereof and so that the bulldozer and blade thereof help sustain the loads of the shovel placed on the tractor to resist strains thereof when the shovel is in use scooping up or dumping a load, and in which the bulldozer cooperates with the shovel by pushing or piling up the earth or other material in front of the tractor in an excavation or otherwise, so that the same may be quickly scooped up by the shovel more easily, and especially in restricted areas or in close proximity to or at the base of a hillside or side of an excavation where the shovel will travel up said side in scooping up a load for filling the shovel for removal by subsequently discharging or dumping the same into a truck or otherwise at either side of the tractor supporting the bulldozer and shovel and by which they may be advanced or moved back to proper working position.

I have designed my new combination of a shovel and bulldozer so that the shovel mechanism can be completely removed from the tractor with a minimum amount of effort and time. By the use of my new and improved combination shovel and bulldozer it requires but one tractor to perform the many duties of a shovel, as well as a bulldozer, thereby requiring a lesser number of pieces on a job requiring shovel and bulldozing work.

These and other incidental objects will be apparent in the drawings, specification and claims.

Referring to the drawings:

Figure 1 is a side elevation of a conventional tractor illustrating the tracks in broken lines, the bulldozer and shovel equipment in full lines. This view illustrates the shovel being operated.

Figure 2 is a side elevation of the shovel in inactive position but showing the full operation of the bulldozer.

Figure 3 illustrates a fragmentary detail plan view of the method of rotating the shovel turntable upon the supporting platform, which in turn is mounted upon the tractor.

Figure 4 is a front elevation of the tractor, bulldozer and illustrating the shovel rotated to ninety degrees on its vertical axis from the position shown in Figure 1 and loading a truck.

Figure 5 is an enlarged fragmentary detail sectional view illustrating the method of mounting the shovel turntable upon its supporting frame, parts broken away illustrating how the operating fluid to the hydraulic cylinders is delivered to the said cylinders.

Figure 6 is a fragmentary edge view of the turntable assembly.

Referring more specifically to the drawings:

I illustrate the tractor by numeral 1, having the usual bulldozer side arms 2 pivotally connected to the tractor and adapted for raising and lowering by the usual bell crank mechanism 3, which is connected to the side arms by the connecting links 4 and operated by the hydraulic cylinders 5. This structure is of well known practice.

In adapting my invention to the tractor, a special frame 6 is mounted to the tractor frame and has a platform 7 pivotally mounted at 8 thereto. Rotatably mounted to the platform 7 is a turntable 9 by way of suitable bearings 9A which encircle a hub 9B, the said hub being fixedly secured to the platform 7 by any suitable means, best illustrated in Figure 5. The outer cone 9C of the bearing assembly is fixedly secured to the turntable 9 at 9D by any suitable means, as for instance by welding.

A sleeve 9E, having a flange 9F is also fixedly secured to the turntable 9 and cone 9C to rotate therewith and extends downwardly through the platform 7. A gear 10 is keyed to the sleeve and is operated by the hydraulic cylinder 12 through the rack 11, referring to Figure 3. The object of this gear and rack is to rotate the turntable on the bearing 9A, which will be more fully described later.

An inner A-frame or boom 13 is pivotally mounted to the turntable at 14 and has an outer or shovel boom 15 pivotally mounted at 16 to its outer and opposite end. A hydraulic cylinder 17 is pivotally mounted at 18 to the turntable 9 at the bottom and front of upright frames 18A fixed on the turntable, having its piston rod pivotally connected to the shovel boom 15 at 19. A standard shovel 20 is pivotally mounted to the boom 15 at 21. Connecting links 22 are pivotally mounted to the shovel at 23 at their one end and to the boom 13 at 24 at their opposite end, the operation of which will be more fully described later on.

A chain 25 is connected to the boom 13 at 26 near its upper and outer end and revolves about the idler sprocket 27 which is journalled to the upper ends of the vertical frames 18A, the said chain having its opposite end connected to the shovel boom 15 at 28 between pivot points 16 and 19 but nearer the latter. The object of this chain is to raise the boom 13 when the hydraulic cylinder 17 by outward movement of its piston rod and connection 19 thereof to shovel beam 15 forces the shovel assembly to the dotted positions indicated in Figure 1. I do not wish to be limited to this chain connection, as referring to Figure 4 in broken lines, I illustrate hydraulic cylinder 25A which may take the place of the chain, although I have found the chain very satisfactory.

The platform 7 may be supported in one or two ways, referring to Figure 1, supporting legs 29 are pivotally mounted at 30 to the platform at their upper ends and pivotally connected to the transversely extending ground engaging member or bulldozer blade 31 at 32 at their lower ends. This connection is made when the shovel is in operation, but when the shovel is operating independently of the bulldozer or taken out of operation, as indicated in Figure 2, the lower ends of these legs 29 are connected at 34 to the frame of the tractor or frame 6 mounted thereon, at the front permitting independent operation of the bulldozer, but in shovel operations when these legs 29 are connected to the bulldozer leg or blade frame they carry out one of the primary objects of my invention, and that is providing a solid foundation upon which the shovel assembly is supported together with the front of the pivoted platform to move up and down independently of the bulldozer, although it may be moved with and assisted by the bulldozer in its operation.

When the shovel is in inoperative position, as indicated in Figure 2, I have provided a special upright supporting bracket or rest for the same on the tractor frame in back of the tractor seat, indicated by numeral 35 upon which the outer or shovel beam 15 of the shovel assembly engages. Hydraulic fluid is controlled by a control valve assembly 36 and fluid is delivered by way of the hose lines 37 and 38 into the stationary stuffing box 39, which is supported by the platform 7 by way of the fitting 40 secured to the framework 41 of the said platform. This stuffing box and fitting always remains stationary.

The downwardly extending sleeve 9E rotates within the stuffing box 39 when the turntable and shovel are revolved in operation. Tubes 42 and 43 are fixedly mounted within the sleeve 9E. The tube 42 terminates at its lower end in the liquid chamber 44 while the tube 43 terminates in the liquid chamber 45. These chambers are separate chambers and are sealed apart by the partition 46. The chamber 45 communicates with the tubing 38 while the chamber 44 communicates with the tubing 37 by way of the annular port 47, which communicates with the tube 37 best illustrated in Figure 5.

Special sealing rings 48 provides a seal between the chamber 45, port 47 and the sleeve 9E relative to the stuffing box 39. Hydraulic fluid is delivered to and from the lines 49 and the cylinder 17 through hose lines 37 and 38 and tubes 42 and 43. I do not wish to be limited to the number of lines incorporated within the sleeve 9E, as more delivery lines could be installed, as for instance if the cylinder 25A were to be used.

I will now described the operation of my new and improved combination shovel and bulldozer. In the event the shovel is to be operated primarily the hookup is made as illustrated in Figures 1 and 4. The supporting legs or racks 29 supporting the platform 7 direct on the bulldozer blade 31. Thus with the ground engaging member or blade 31 in contact with the ground as in Fig. 1, the stress and strain of the operation of the shovel is transmitted through the links 29 and member or blade 31 to the ground. Such supporting action eliminating the use of a counterbalance when the shovel is being operated. With the member or blade 31 in engagement with the ground there is no tendency of the tractor to tilt forward. This is an important feature of my invention since the member or blade 31 will act as an intermediate support, with the ground becoming the main support for the shovel assembly during the operation thereof. When the controls 36 are operated by the operator and fluid enters the cylinder 17 it forces the shovel boom 15 to the various dotted positions. The chain 25 raises the boom 13 while the cylinder 17 forces the shovel boom 15 to these dotted positions, and at the same time the links 22 pivot the shovel 20 about its pivot 21 to the various positions shown by dotted lines for efficiently digging and scooping up a load at the blade 33, as well as for discharge of the load by opening the back tail gate of the shovel in the usual manner.

In order to rotate the shovel turntable to the position shown in Figure 4 from Figure 1, the operator operates his controls 36 in the desired manner to operate the hydraulic cylinder 12, which operates its piston rod carrying the rack 11 in a direction to rotate the turntable by way of the gear 10 and sleeve 9E to the desired position. When the machine is hooked up in this manner it is also in position to attach and operate the bulldozer in various operations, but when it is desired to use the bulldozer within itself and without the operation of the shovel the supporting legs 29 are transferred to the point 34 on the tractor frame and the shovel boom 15 and shovel assembly are rotated to the position shown in Figure 2, resting upon the bracket 35. This gives a balanced machine in the operation of the bulldozer in its various operations.

Although certain specific embodiments of the invention have been shown and described, it is obvious that many modifications thereof are possible. The invention, therefore, is not to be restricted except in so far as is necessitated by the prior art and by the spirit of the appended claims.

I claim:

1. An earth moving apparatus comprising a tractor, arms pivoted at the sides of the tractor, a transversely extending ground engaging member rigidly connected to the forward ends of the arms across the front of the tractor and said member adapted to be raised from or lowered to ground engaging position, a frame supported on and over the tractor, a platform pivoted at the back of the frame and having supports at the front removably connectable to the transversely extending ground engaging member to support the front end of the platform when the transversely extending ground engaging member is lowered into ground engaging position, a turntable rotatable on the platform and having means to rotate the same, a shovel assembly including an inner boom pivoted on the turntable, an outer boom pivoted to the outer end of the inner boom, means connecting the outer boom and turntable to raise and lower the outer boom, means connecting the booms to raise and lower the inner boom with the outer boom, a dump shovel pivoted to the outer end of the outer boom, and means connecting the inner boom and shovel outwardly of its pivot to raise and lower the shovel with the booms.

2. An earth moving apparatus comprising a tractor, a frame mounted on said tractor, a transversely extending ground engaging member movably mounted on the tractor, a platform pivotally connected to said frame, a turntable rotatable on said platform, means for connecting the transversely extending ground engaging member to the platform to support the platform when said transversely extending ground engaging member is in engagement with the ground to prevent tilting of the tractor, a shovel carried by linked booms pivoted on said turntable, means on the platform and cooperating with the turntable at its axis for power operating the turntable to thereby move the shovel and means carried by the turntable and connected to the linked boom carrying the shovel for operating the shovel for digging.

3. An earth moving apparatus including a tractor, a frame supported on the tractor, a transversely extending ground engaging member in front of the tractor having arms pivoted at the sides of the tractor and adapted to be raised from or lowered to ground engaging position, said frame having a pivoted part, means carried by the free end of the pivoted part to connect the same to the transversely extending ground engaging member, a turntable rotatable on the pivoted part, means on the frame to rotate the turntable in the arc of the circle, an articulated boom pivoted on the turntable, a dump shovel pivoted to the outer end of the boom, means on the turntable to swing the boom up and down in an arc, and means on the frame to similarly swing the shovel with the boom.

4. An apparatus of the class described including a vehicle, a frame mounted thereon and having a pivoted platform, an earth engaging member movably mounted on the vehicle to be raised or lowered independent of said frame, means carried by the free end of the platform for connecting the same to the earth engaging member for supporting said platform when said earth engaging member is in earth engaging position, a turntable rotatable on the platform, a shovel assembly pivoted on the turntable to turn therewith to the side or toward the back over the vehicle, and means on the turntable to raise or lower the shovel assembly.

5. An apparatus of the class described, comprising an endless track laying vehicle, a frame supported on the vehicle and extending above the same, a platform pivoted at the back thereof to the frame over the vehicle, an earth engaging member across the front of the vehicle and pivoted at the sides thereof to swing up and down, supporting means pivoted at the front of the platform adapted to be connected at its lower end to the earth engaging member to be supported by the member when said member is in earth engaging position, a turntable mounted on the platform, means operatively connecting the platform and turntable to rotate the latter, an inner boom pivoted on the turntable, an outer boom pivoted to the outer end of the inner boom, a dump shovel pivoted to the outer end of the outer boom, a link pivotally connecting the shovel outwardly of its pivot to the inner boom near its connection to the outer boom, means on the turntable to swing the outer boom and shovel up and down in an arc, and means on the frame to cause similar swinging of the inner boom with the outer boom and shovel.

WILLARD A. MAXWELL.

References Cited in the file of this patent

UNITED STATES PATENTS

| Number | Name | Date |
| --- | --- | --- |
| 2,233,237 | Anderson et al. | Feb. 25, 1941 |
| 2,387,656 | Gledhill | Oct. 23, 1945 |
| 2,387,764 | Maxwell | Oct. 30, 1945 |
| 2,404,926 | Schmacht | July 30, 1946 |
| 2,445,614 | Flynn et al. | July 20, 1948 |
| 2,446,220 | Erdahl | Aug. 3, 1948 |
| 2,451,101 | Leschinsky | Oct. 12, 1948 |
| 2,462,926 | Wilson et al. | Mar. 1, 1949 |
| 2,502,681 | Swanson | Apr. 4, 1950 |

OTHER REFERENCES

Bucyrus-Erie Bulletin L 11 "Loadmaster," November 7, 1938, pages 12 and 13.